United States Patent [19]

Kuder

[11] 4,182,951
[45] Jan. 8, 1980

[54] WELD BACK UP ASSEMBLY

[75] Inventor: Benedict A. Kuder, Drexel Hill, Pa.

[73] Assignee: B. A. Kuder Co., Philadelphia, Pa.

[21] Appl. No.: 906,069

[22] Filed: May 15, 1978

Related U.S. Application Data

[63] Continuation of Ser. No. 737,784, Nov. 1, 1976, abandoned.

[51] Int. Cl.² ............................................. B23K 9/02
[52] U.S. Cl. .................................... 219/160; 228/50; 228/216
[58] Field of Search .................. 219/160; 228/50, 216

[56] References Cited

PUBLICATIONS

The Condensed Chemical Dictionary, sixth edition, Reinhold, N.Y. 1962, pp. 1103–1104.

*Primary Examiner*—E. A. Goldberg
*Attorney, Agent, or Firm*—Eugene E. Renz, Jr.

[57] ABSTRACT

An assembly for shielding the underside of a weldment joint comprising an elongated, flexible, preferably metallic mounting strip and a plurality of small, discrete back up blocks made of a refractory material suitably secured in end to end array to one face of the metallic strip centrally thereof. The blocks preferably having a groove wider than the weldment joint, the grooves being aligned to define a channel confronting the joint and of a predetermined depth to control the penetration and depth of the weld bead. The back up blocks are of a width narrower than said metallic strip to expose side edge portions of said metallic strip, the exposed side edge portions having an adhesive coating to provide a substantially air-tight sealing engagement with the weldment joint along both edges of the mounting strip.

The assembly has a degree of flexibility to permit conformation of the assembly to the shape of the weldment and in use supports slag and the welding pool formed during welding.

9 Claims, 14 Drawing Figures

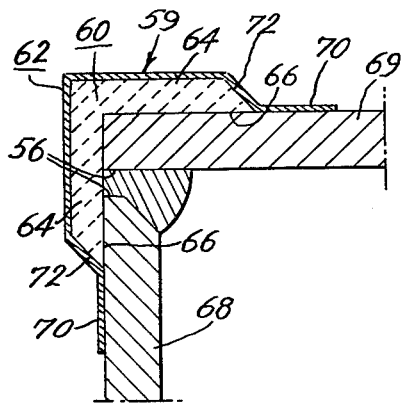
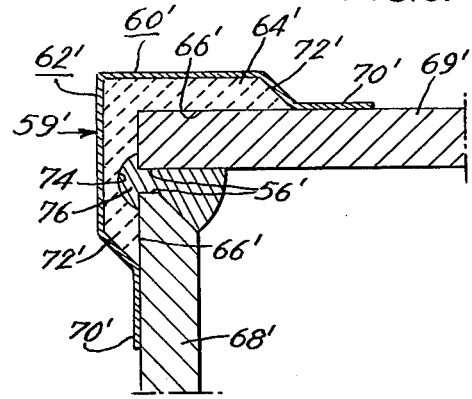
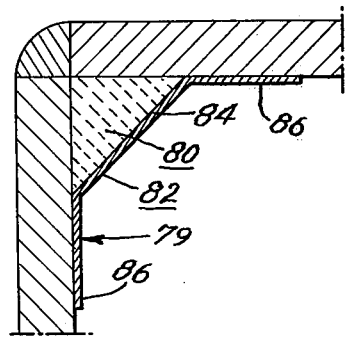
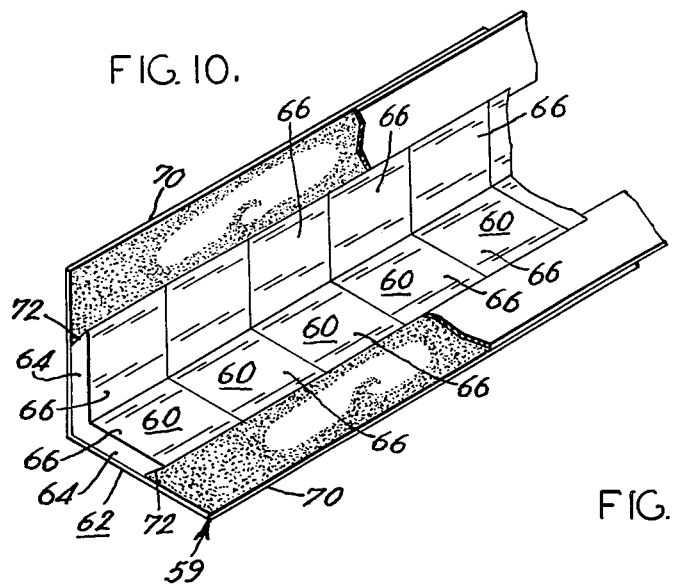
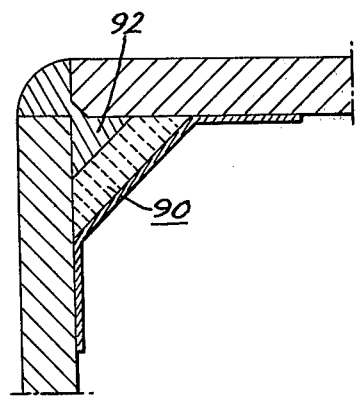
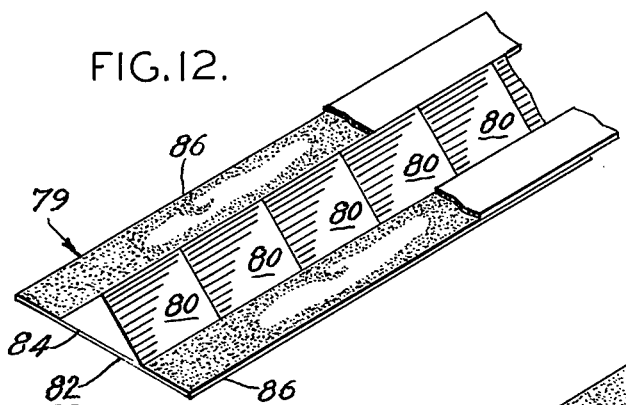
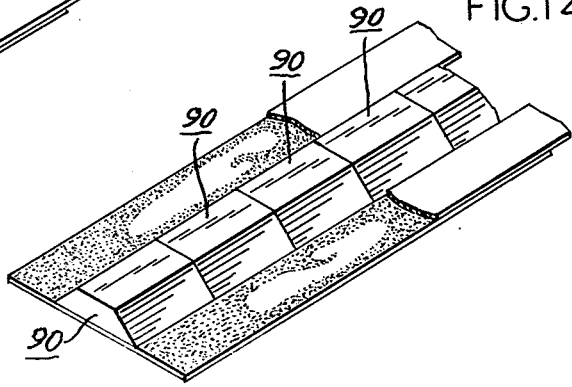

WELD BACK UP ASSEMBLY

This is a continuation, of application Ser. No. 737,784 filed Nov. 1, 1976 now abandoned.

DESCRIPTION OF THE INVENTION

This invention relates to an improved weld back up assembly. Weld back up tape described in U.S. Pat. No. 3,365,566, issued to me on Jan. 23, 1968, has found widespread acceptance in the welding art. My earlier weld back up tape and a variety of other weld tape products and their application are discussed in an article authored by R. H. Keith, entitled "Weld Backings", in the June, 1975 edition of *Welding Journal*. My prior tape essentially comprises a layer of flexible metallic foil having a strip of woven fiberglass supported centrally thereof which confronts the weldment joint.

The weld back up tape described in my earlier patent produces high quality weld, serves to back up the underside of the joint being welded and prevents the underside of the weld from being exposed to contamination from the atmosphere while in the molten state. In addition, my earlier weld back up tape has the advantages of ease of attachment to the weldment by pressure sensitive adhesive and ready conformability to curved surfaces as the result of its flexible nature. Another significant advantage is that welds can be made without inert gas shielding as the weld back up tape serves to seal the weldment from the atmosphere.

It has been found that use of my earlier weld back up tape may have certain disadvantages particularly when welding heavy gauge material, i.e., material 0.500" thick or more, as the result of burn through the heat resistant fibrous material during welding. When "burn through" occurs as the result of the high temperatures and relatively long time required for heavy gauge welding, the weldment may be exposed to the atmosphere and the back up tape loses its ability to influence the shape and condition of the underbead. In some instances, it has been found necessary to use an inert gas to shield the underside of the weld. This of course, adds to the expense of the welding operation.

It is the object of this invention therefore, to provide an improved weld back up assembly which eliminates the problem of "burn through", and which is flexible, easily conformable to the weld surface, and useful in heavy gauge, high-temperature welding applications.

Another object is to provide a weld back up assembly which is flexibly conformable and provides support for slag and the welding pool produced during welding, providing an underbead which is of a controlled, substantially uniform depth and which is clean, smooth and free of defects.

It is a further object of the present invention to eliminate the need for inert gas shielding on the underside of the weld.

BRIEF DESCRIPTION OF THE FIGURES

These and other objects and various features and details of the present invention are described more completely with reference to the accompanying drawing wherein:

FIG. 8 is a sectional view of a corner joint employing a back up assembly in accordance with the present invention; FIG. 9 is a view similar to FIG. 8 showing a modified form of corner joint back up assembly;

FIG. 10 is a perspective view of a section of the back up assembly of FIG. 8;

FIGS. 11 and 13 are sectional views of corner joints illustrating inside weld back up assemblies in accordance with the present invention; and FIGS. 12 and 14 are perspective views of the back up assemblies of FIGS. 11 and 13 respectively.

DESCRIPTION OF THE PREFERRED EMBODIMENTS

Figure 1:
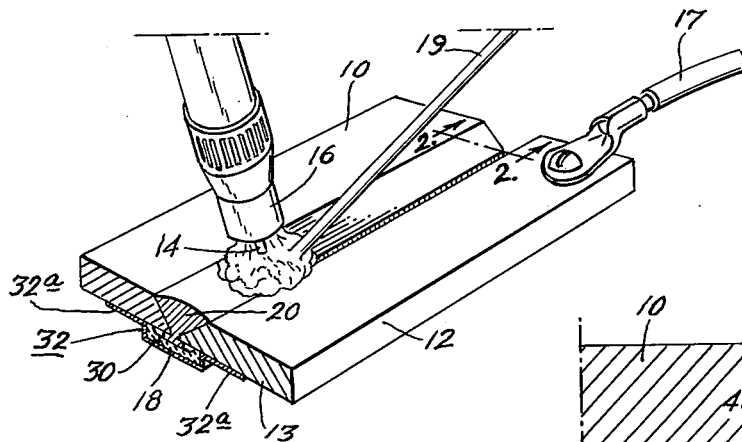
FIG. 1 is a perspective view illustrating a conventional electric welding process employing a back up assembly in accordance with the present invention.

Referring now to FIG. 1 of the drawing, there is illustrated a conventional electric welding apparatus for use in welding structural plate members 10 and 12 of a weldment 13 to one another. The apparatus includes a tungsten or carbon electrode 14 which is connected to a source of electric power and which is mounted centrally of a cylindrical cup 16 and a lead 17 connecting one of the members to ground. Inert gas from a suitable source is delivered through cup 16 to provide a shield adjacent the tip of electrode 14. Plate members 10 and 12 to be joined are maintained in a spaced apart relation in a conventional manner to define a joint 18 therebetween. By this arrangement, filler metal 19 may be introduced in the arc struck by electrode 14 to form the bead 20 joining the structural members together at the joint 18.

Figure 5:
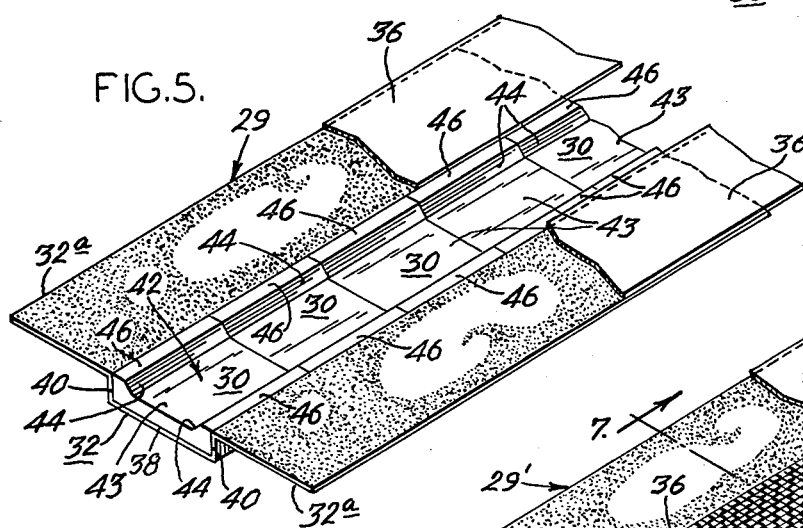
FIGS. 5 and 6 are perspective views of various forms of weld back up assemblies in accordance with the invention.

In accordance with this invention, means is provided for supporting the underside of the weld to protect the same from atmospheric contamination, to support the slag and weld pool providing an underbead which is smooth, clean and free of defects. The principal embodiment of weld back up assembly of the present invention is best illustrated in FIG. 5 and comprises a series of small generally square back up blocks 30 supported in end to end array in an elongated, flexible thin mounting strip 32, preferably of a metallic material such as copper or aluminum alloy. The blocks 30, which are aligned in a row, are of a width narrower than the strip 32 to expose side edge regions 32a,32a coated with a suitable heat resistant adhesive, such as a silicone pressure sensitive type to permit application of the back up assembly flush to the underside of the weldment in the manner shown. The end to end abutment of the short support blocks 30 provides a tractor tread like form allowing close conformability of the weld back up assembly 29 even to weldments which are arcuate or curved. The tractor tread form of the support blocks in the back up assembly of this invention provides considerable improvement over other weld back up systems employing ceramic back up materials, such as that supplied by the Varios Comany in Holland in which ceramic sections of considerable length of 6" – 24" or more are supported by lengths of an inflexible metal back up bar and attached to a weldment by awkwardly applied magnetic and spring clamping means. To facilitate packaging and handling a removable liner 36 overlies the side edge regions 32a, the liner 36 being a treated paper, coated parchment, vinyl film or other suitable commercially available type which peels easily.

The back up assembly of the present invention is very easy to manufacture. For example, an adhesive coating is simply applied to one face of the strip 32, the blocks 30 are then laid on the adhesive coated surface centrally of the strip and then the paper liner is applied over the side edge regions 32a, 32a. The mounting strip 32 may be positioned over a fixture having a groove or channel of a width slightly greater than the blocks to obtain good conformity and adherence of the strip to the base 38 and outer side walls 40 of the blocks 30. The liners are easy to remove prior to application of the assembly to the underside of a weldment and serve to preserve the bonding quality of the adhesive.

The back up blocks 30 (FIGS. 1 and 2) as shown, are thin wafer like elements of square or rectangular shape and are of a comparatively short length to permit conformation to weldments which are contoured as contrasted to flat. The upper face 42 of each block has a grooved recess 43 of a predetermined width W greater than the width $W_1$ of weldment joint 18 to allow for slight misalignment of the assembly when applying it over the weldment joint. The outer edges of the groove are slightly beveled as at 44 and are spaced inwardly from the sides of the block to define flat, land areas 46 on either side of the groove 44 engaging flush against the weldment on either side of the joint.

Describing the weld back up assembly with greater particularity, the flexible metallic strip comprises aluminum or an aluminum alloy of a thickness between 0.003 and 0.009 inches having an adhesive on one surface thereof. Alloys of other metals such as copper and stainless steel could be used to form the flexible metallic mounting strips.

Support blocks 30 are individually rigid, inflexible objects manufactured from materials selected from the group consisting of ceramic, glass, metal, fibrous and "solid" refractory materials. The materials from which supporting blocks 30 are prepared share the common property of resistance to the temperatures encountered in the welding operation, i.e., the supporting blocks do not melt at welding temperatures, and therefore, in the case of metal supporting blocks, for example, they are incompatible with and do not become alloyed with the weld joint. Other common properties include insensitivity to humidity, that is, the supporting blocks will be prepared from refractory materials which absorb little, if any, moisture. High temperature, heat resistant metals such as copper, stainless steel and tungsten alloys may be used as blocks 30. Similarly powdered metal alloy molded together with high temperature resistant binders and chopped fibrous materials, such as fiberglass held together with high temperature resistant binders, may be used to form blocks 30.

Figure 4:
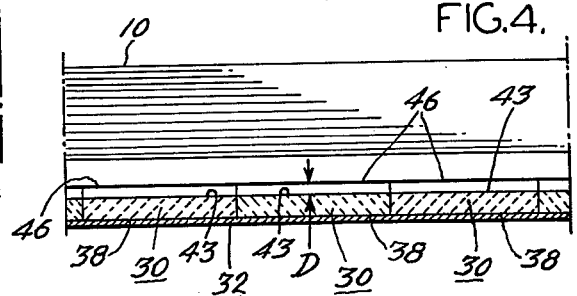
FIG. 4 is an enlarged sectional view taken along lines 4—4 of FIG. 2.

The supporting blocks of this invention are preferably ceramic blocks about 1" square and about 0.250" thick. The depth D of groove 43 (FIGS. 2 and 4) is between about 0.055" and about 0.065", preferably about 0.062", so that the thickness T of the block between the base of the groove and the bottom of the block is between about 0.185" and about 0.195". The thickness T can be varied somewhat to eliminate thermal cracking. A suitable ceramic refractory material is available commercially and has long been known in the ceramic art as steatite.

As the result of the dimensions of groove 43 described herein, the groove provides means for supporting the weld puddle formed during welding and provides an excellent back stop against which a smooth underbead can form. Further, since the weld back up assembly is adhered in an air tight manner to the weld assembly, the weldment is protected from contamination by the atmosphere producing a clean weldment of good quality.

The particular metal used to prepare refractory support blocks for use on the weld back up assembly of the invention will depend on the metal being welded, that is, if the supporting block is metal, it must be of a material refractory to the temperatures at which welding occurs, e.g., a metal having a higher melting point than the metals being welded. For example, support plates of copper or stainless steel could be used in weld back up tapes for use in welding aluminum.

Figure 2:
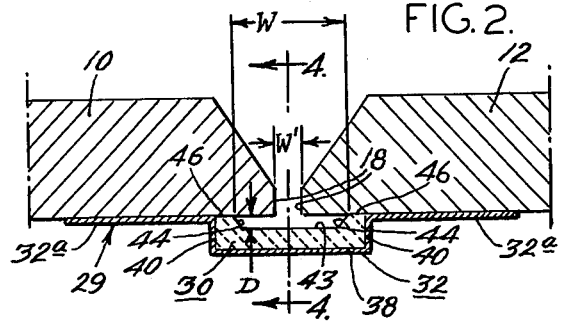
FIG. 2 is an enlarged sectional view taken along lines 2—2 of FIG. 1.
Figure 3:
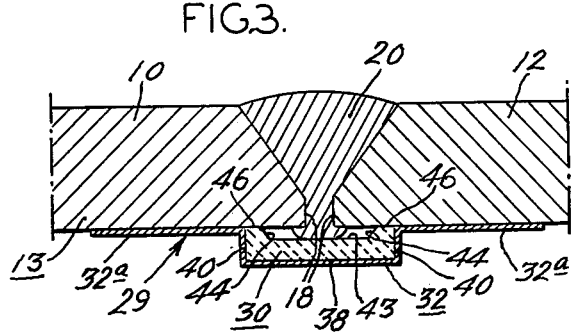
FIG. 3 is a cross sectional view of flat block members to be welded employing the back up assembly of this invention.

In the process of preparing weldment 13 employing the weld back up tape of this invention, the joint surfaces of the weldment 13 are cleaned in the usual manner and plate members 10 and 12 of the weldment are supported in a fixture or by tack welding to define joint 18. Thereafter, weld back up assembly 29 (FIG. 5) is applied to the underside of joint 18 as illustrated with ceramic blocks 30 confronting and covering joint 18 as illustrated, and the adhesive area 32a of back up assembly bonded to members 10 and 12 to support the assembly 29 in position as indicated in FIGS. 2 and 3.

The weldment 13 is now ready for welding whereby, in the process illustrated, the arc is struck by electrode 14 and weld rod 19 placed in the region of the arc to provide the weld puddle. The weld puddle penetrates joint 18 to a depth controlled by channel defined by the grooves 43 of the blocks 30.

It has been demonstrated that the weld back up assembly 29 of this invention effectively precludes atmospheric contamination of the underside of the weldment and provides good support for the weld puddle producing a finished weld with a good underbead which requires little, if any, post weld gouging or cleaning even in high temperature welding operations. In addition, it will be appreciated that, as the result of their refractory nature, blocks 30 serve as a heat sink during welding operations, and preclude the possibility of burn through of the back up assembly during welding. Prevention of burn through further ensures the integrity of the air tight enclosure of the weld joint and eliminates the possibility of contamination of the weld being formed as the result of contact with the atmosphere which would lead to undue oxilation and the formation of a weakened or "dirty" underbead requiring cleaning or additional welding.

Figure 6:
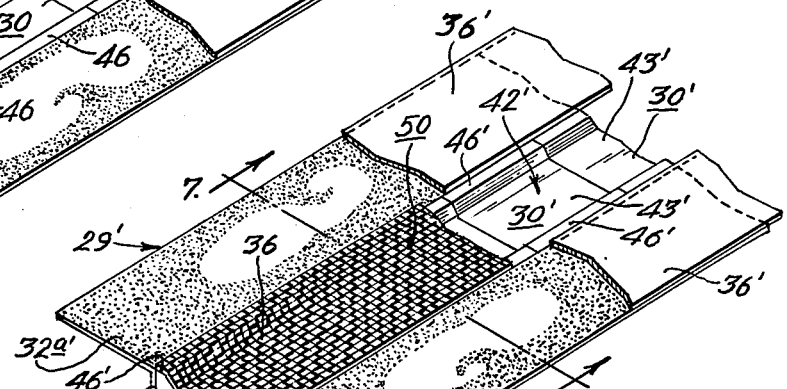
Figure 7:
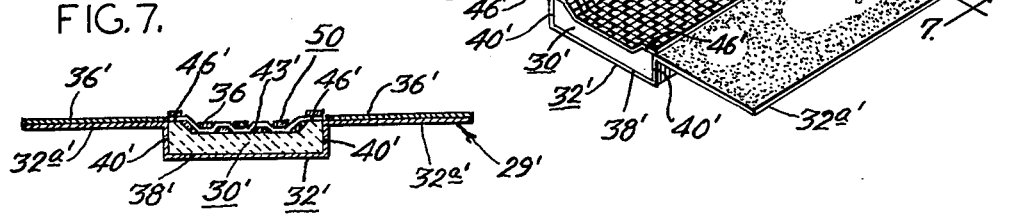
FIG. 7 is an enlarged sectional view taken along lines 7—7 of FIG. 6.

A modification of the back up assembly described above is illustrated in FIGS. 6 and 7. The arrangement of the refractory blocks in the flexible layer is the same as that previously described, the assembly 29' including additionally at least one layer or ribbon 50 of flexible heat resistant material overlying the channel formed by the back up blocks. The ribbon 50 is supported at its outer side edges by a suitable adhesive applied to the flat land areas 46' of the blocks. The ribbon 50 is preferably a heat resistant material such as woven fiberglass fabric; i.e., a fabric comprising glass fibers which are non-flammable, moisture resistant and unaffected by most acids. A plurality of layers or ribbons of the woven fiberglass fabric 36, numbering from 2 to 5, more especially about 3 layers of fabric, may be used. The woven fiberglass provides fluxing action as it becomes molten during the welding operation, and since support plates 30' provide a back up for the weld puddle, the fluxing action serves to provide the underbead with a smooth, polished surface.

Additional embodiments of weld back up assemblies in accordance with the present invention are illustrated in FIGS. 8–14 inclusive. The back up assemblies are designed specifically to weld corner joints from the outside or inside seam of a corner joint. The back up assembly 59 illustrated in FIG. 10, which is used on welding corner joints from the inside comprises a plurality of short back up blocks 60 made of a refractory material of the type set forth above. For example, the blocks 60 are made of a high temperature ceramic, preferably unglazed and insensitive to humidity, which blocks 60 are supported in end to end array in a flexible layer 62 of thin gauge copper or aluminum. The blocks 60 as illustrated, have two right angularly disposed side wall portions 64, the inner faces 66 of which are designed to lie flush against the right angularly disposed faces of the plates 68 and 69 of the corner joint in the manner shown in FIG. 8. The inner faces 66 of the side walls are flat to provide a flat bead when the weld material is introduced into the seam 56 of the joint. The blocks 60 as shown in FIG. 10, are mounted in abutting end to end relation and supported in the elongated mounting layer 62 by a suitable adhesive. If desired, the flexible mounting layer 62 may be a fiberglass tape. The layer 62 is preferably of a width to extend beyond the outer edges of the side walls of the blocks to provide extended side edge regions 70 for securing the tape to the weldment at these extended side edge regions in the manner illustrated. The outside edges of the blocks are preferably beveled as at 72 so that the assembly may be secured flush against the corner joint in an air tight manner, and to ensure a stronger adhesion.

A somewhat modified version of the back up assembly is illustrated in FIG. 9. The general configuration of the blocks and metallic mounting layer in which they are supported is the same as FIG. 8, except that in the present instance a groove 74 is provided on the inner face of the blocks which defines a pocket 76 adjacent the seam for the weld material when a weld bead is specified for the outside surface of the corner joint.

FIGS. 12 and 14 illustrate additional embodiments for use on corner joints wherein the joint is welded from the exterior. Thus, the back up assembly 79 in FIG. 12 comprises a series of blocks 80 of triangular cross section mounted in an abutting end to end relation on a thin metallic flexible mounting layer 82, the layer 82 being of a greater width than the base 84 of the blocks to define side edge regions 86 for securing the back up assembly to the corner joint in the manner shown.

The back up assembly shown in FIG. 14 is also for the inside of a corner joint, except that in this instance, the blocks 90 are of a trapezoidal cross section thereby leaving a small triangular gap 92 for the weld material on the inside of the corner joint, as illustrated in FIG. 13.

The joints illustrated are right angular joints. However, it is to be understood that the back up assembly has useful application to a full range of joint angles by simply conforming the shape of the blocks to the desired joint angle. Further, the back up assembly may be used on the underside of a double beveled butt joint.

In sum, the weld back up assembly of this invention provides means for one side welding of particularly heavy gauge material. The weld back up tape of this invention is flexible and conformable, and easily applied to weldments of a variety of shapes and configurations. Importantly, the weld back up assembly of this invention is self-supporting and does not require back up bars or any of the variety of clamping and attachments means prevalent in weld back up systems currently in use. Of paramount importance, is the fact that the weld back up assembly of this invention provides means for the development of a well supported weld puddle thereby permitting the formation of a clear, smooth underbead and eliminating the necessity of time consuming and expensive grinding, back-gouging and re-welding of the bottom side of the weld after the first weld is made. The weld back up assemblies of this invention provides for substantial savings in labor and energy costs as they permit higher temperature and higher speed welding operations. Also, with higher temperature welding procedures, greater weld penetration is achieved and weld quality is enhanced as the result of one sided welding.

I claim:

1. A back up assembly for shielding the underside of a weldment joint during welding, comprising: an elongated, flexible, metallic strip and a plurality of wafer like blocks of steatite arranged in a row and mounted centrally of said strip, said blocks being of a transverse dimension less than the width of said strip to expose side edge regions on either side of said row, and adhesive means on said side edge regions to secure said assembly to said weldment during welding.

2. A back up assembly according to claim 1 wherein said metallic strip is thin gauge aluminum.

3. A back up assembly according to claim 1 wherein said steatite blocks have two angularly disposed side walls to fit over the outside seam of a corner joint.

4. A back up assembly according to claim 1 wherein said steatite blocks are of trapezoidal cross section to fit the inside seam of a corner joint.

5. A back up assembly according to claim 1 wherein the steatite blocks are of triangular cross section.

6. A back up assembly according to claim 1 comprising in addition, means defining a groove in the upper exposed face of said blocks extending longitudinally to define a continuous channel overlying the weldment joint.

7. A back up assembly according to claim 6 wherein said metallic strip is thin guage aluminum.

8. A back up assembly according to claim 6 comprising in addition, a ribbon of heat resistant fiberglass overlying said channel.

9. A backup assembly according to claim 7 comprising in addition, a ribbon of heat resistant fiberglass overlying said channel.

* * * * *